Figure 1:
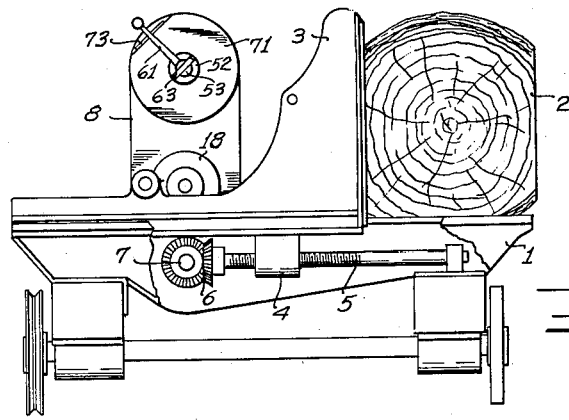

Feb. 29, 1944. L. J. PETERS 2,342,967
SETWORKS
Filed Jan. 26, 1942 2 Sheets-Sheet 1

LESTER J. PETERS
INVENTOR.

BY *E. A. Buckhorn*
ATTORNEY

Feb. 29, 1944.  L. J. PETERS  2,342,967
SETWORKS
Filed Jan. 26, 1942  2 Sheets-Sheet 2
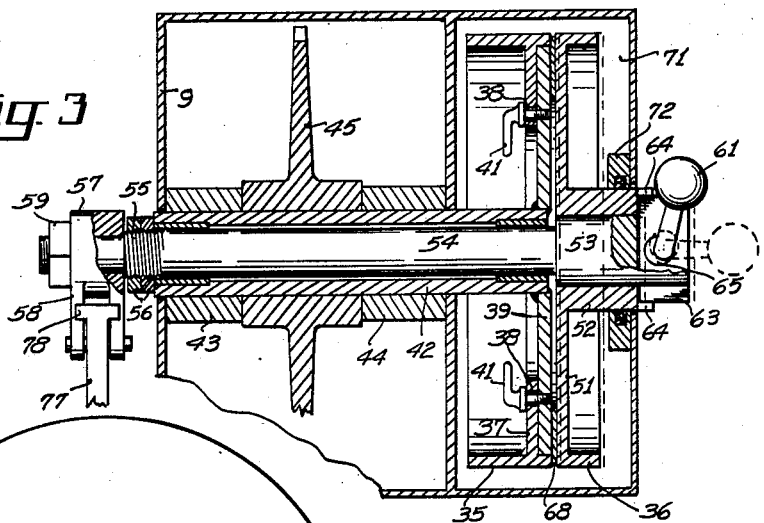
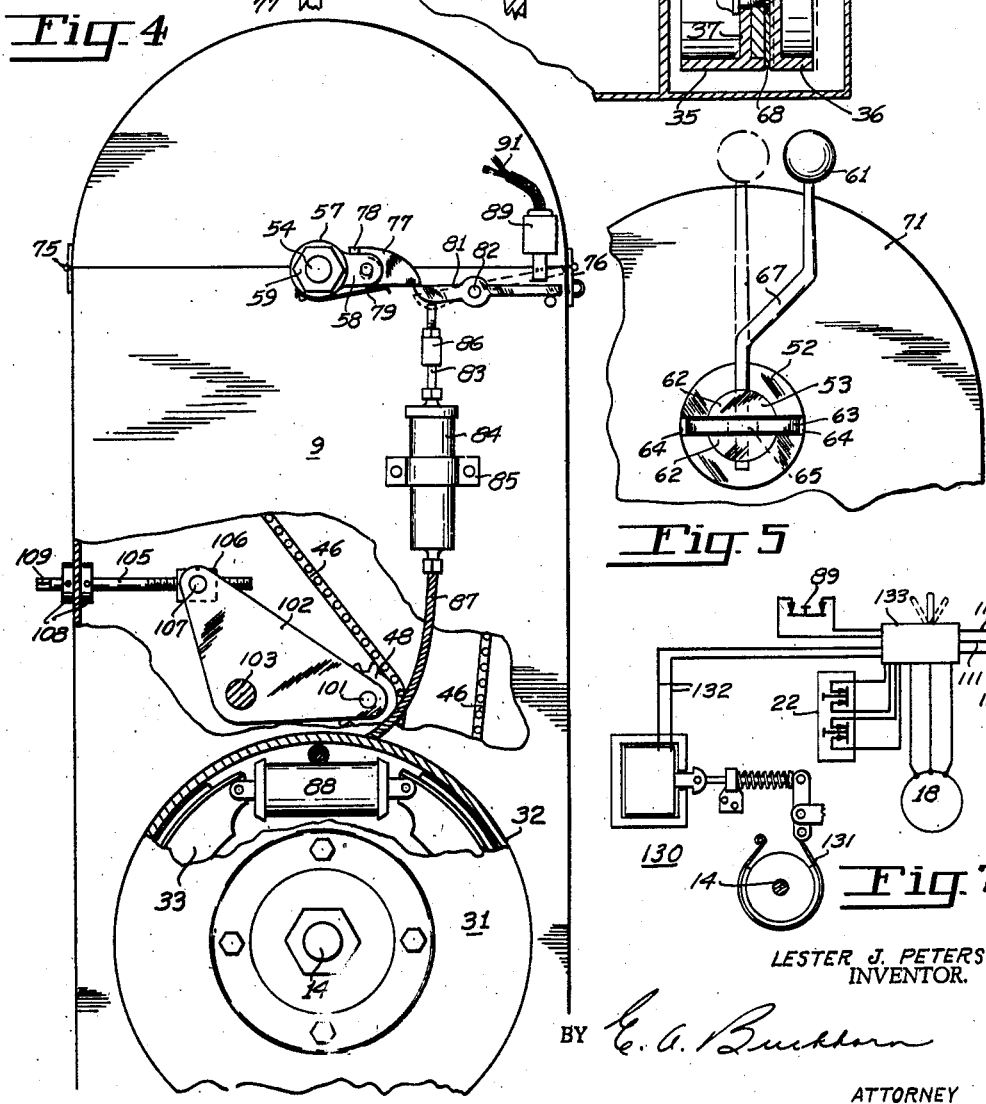
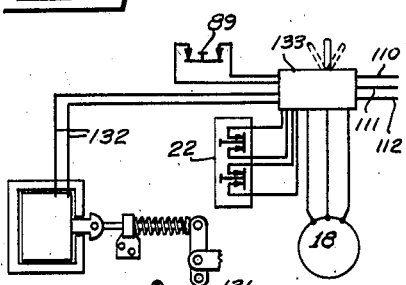
LESTER J. PETERS
INVENTOR.
BY *E. A. Buckhorn*
ATTORNEY Patented Feb. 29, 1944

2,342,967

UNITED STATES PATENT OFFICE 2,342,967

SETWORKS

Lester J. Peters, Portland, Oreg.

Application January 26, 1942, Serial No. 428,149

11 Claims. (Cl. 143—120)

The present invention relates to setworks for indicating and predetermining the relative angular movement of an operating shaft. While the invention is not necessarily to be limited to such specific application, it is particularly adaptable for use in connection with sawmill carriage control.

In certain types of machines a support or holder is provided for a work piece upon which an operation is to be performed by a working tool arranged in a cooperative relation with respect thereto. Upon the completion of one cycle of operation a readjustment is effected between the support or holder for the work piece and the working tool to recondition the setup for a succeeding operating cycle. The adjustment may be effected either by moving the work piece toward the tool or by moving the tool toward the work piece, whichever may be most convenient. Under certain conditions, such as when the part to be adjusted is relatively massive, a power drive is provided which introduces a problem of control in order to insure accuracy of adjustment. The power drive will usually consist essentially of motor means connected to an operating shaft either through a fast coupling or a clutch. The problem of control, therefore, entails the deenergization or declutching of the motor means and the arresting of the motion of the operating shaft in a predetermined angular position.

It is a general object of the invention, therefore, to provide a new and improved setworks for indicating and predetermining the relative angular position of a driven operating shaft.

It is a further object of the invention to provide a new and improved setworks for facilitating accurate control of adjustment effected through a power drive connection between a work piece holder and a tool.

Considering a specific application, for example, the sawing of lumber in which the work piece, in this instance, is a log and which is supported upon a carriage arranged cooperatively adjacent the tool, in this case, a saw. The carriage is so constructed and arranged that after each successive swing operation, the log is shifted toward the saw by a distance corresponding to the thickness desired for the next cut. Because of the great size and weight of the log and carriage mechanism, a power drive usually is provided for effecting the shifting movements, while the movements are controlled through means including a setworks. Since commercial lumber thicknesses are standardized, it is desirable that the increments of advancing movements of the log or cant toward the saw be accurately controlled in order to effect a maximum footage from the log. The setworks now in common use throughout the lumber industry leave much to be desired in this respect. Due to inherent inaccuracies in the conventional setworks, the variation between the set and the cut frequently runs as high as three-sixteenths to one-quarter of an inch. In order to insure that the boards will be of a thickness sufficient to dress to standard dimension, it is a usual practice to run the set high, that is, to intentionally cut the boards considerably thicker than necessary in order to compensate for the maximum of the range of inaccuracy of the setworks. In cutting four-quarter stock, for example, it will be obvious that this practice results in a substantial loss in footage as compared with what might be obtained if the boards are cut more accurately to the required thickness.

It is another object of the intention, therefore, to provide a new and improved setworks for sawmill carriages of the type having a power drive for effecting adjusting movements of a log supported thereon.

A more specific object of the invention is to provide a new and improved setworks for sawmill carriages whereby the increments of forward movement of the log on the carriage may accurately be controlled in accordance with a predetermined setting of the mechanism.

Another object of the invention is to provide a new and improved setworks for sawmill carriages which is so constructed and arranged whereby the operator may effect adjustment of the carriage for any predetermined thickness of cutting with a minimum of effort and time.

A further object of the invention is to provide a new and improved setworks mechanism which is of a simple compact design and which may readily be installed as a unit in a sawmill carriage of conventional types.

Further objects and advantages of the invention will appear from the following description, taken in connection with the accompanying drawings, while the features of novelty characterizing the invention will be set forth with greater particularity in the appended claims.

Figure 6:
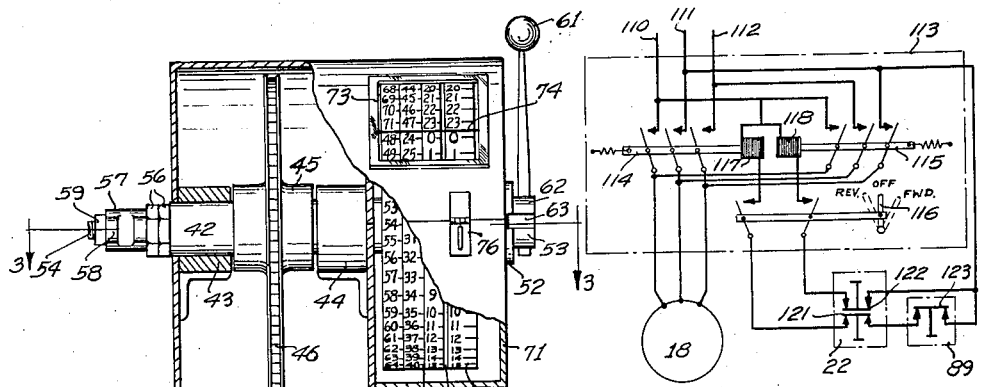
Figure 2:
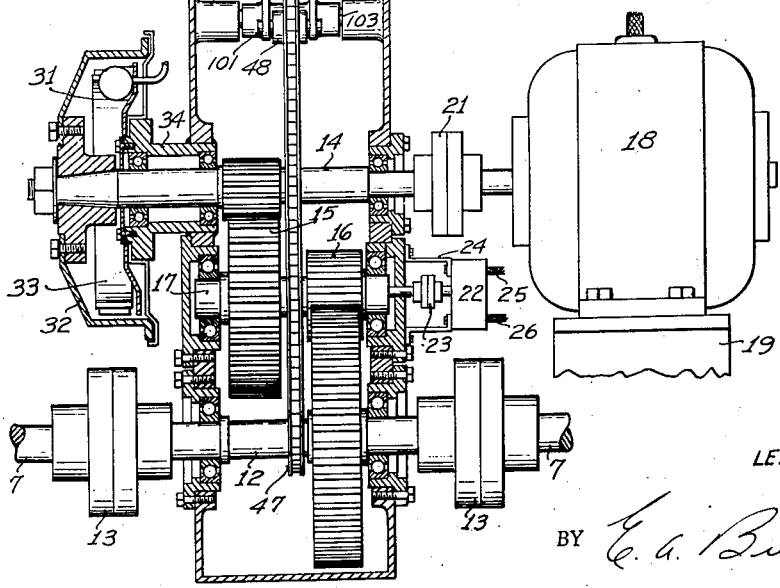

In the drawings, Figure 1 is an end view of a typical sawmill carriage illustrating a setworks of the present invention installed thereon; Figure 2 is a front sectional view through the setworks illustrating the structural arrangement of parts within the housing; Figure 3 is a cross sectional view through the upper part of the setworks, taken along the line 3—3 of Figure 2; Figure 4 is a view of the brake end of the setworks, certain portions of the housing being broken away to illustrate further details; Figure 5 is a fragmentary end view of the upper portion of the setworks; Figure 6 is a schematic diagram illustrating the electrical control system for the setworks; and Figure 7 is a schematic diagram illustrating a further modification of the invention.

In the following description the setworks of the present invention will be described as it may be adapted for use in conjunction with a sawmill carriage control, though it will be understood readily by those skilled in the art that the invention is not to be necessarily so limited, since the setworks may be embodied in any machine in which it is desired to control the angular movement of an operating shaft for predetermining the positioning of other elements driven thereby.

Referring to Figure 1, a sawmill carriage is shown consisting essentially of a plurality of head blocks 1 upon which may be supported a log or cant 2 from which boards of lumber may be sawed. The cant 2 is backed by a plurality of knees 3 slidably arranged upon the head blocks 1. The knees 3 are each provided with a depending nut 4 cooperatively threaded upon a screw 5, the various screws being adapted to be driven through suitable gearing 6 by an operating shaft 7. Upon rotation of the operating shaft 7 the nut 4 will be advanced along the screw 5 causing the knee to move forwardly relative to the head blocks 1 sliding the cant 2 toward the saw. A suitable motor means may be provided for driving the operating shaft 7, while for selectively controlling the extent of movement thereof, and hence the forward movement of the cant 2, a setworks 8 is provided upon the carriage.

Referring more particularly to Figure 2, the setworks comprises a housing, including a pair of spaced apart side walls 9 and 11, which substantially encloses the working parts of the setworks. A shaft section 12 is journaled within the lower part of the housing and is adapted to be connected through suitable means such as couplings 13 to adjacent ends of an operating shaft, for example, the shaft 7 of the sawmill carriage. A drive shaft 14, also journaled in the housing, is operatively connected to the shaft section 12 through means such as suitable speed reducing gearing 15, 16 mounted on shaft 17. Any suitable source of power for operating the shaft 7 may be connected to the drive shaft 14, such as an electric motor 18 mounted on the carriage by means of a bracket 19, the motor being connected to an end of the drive shaft 14 by a coupling 21. The motor control system includes a two way limit switch 22 which is connected by coupling 23 to an extension of the gearing shaft 17. The switch is mounted on the housing by suitable brackets 24 and has pairs of leads 25 and 26 extending to the motor controller. This switch and the motor control system in general will be described more fully hereinafter with particular reference to the wiring diagram of Figure 6. A brake, indicated generally at 31, is operatively associated with the drive connection and, while in this specific modification it is shown mounted on the end of the drive shaft 14 opposite the motor 18, it will readily be understood that it may be applied, if desired, to any shaft of the driving connection between the motor 18 and the knees 3. As illustrated, the brake 31 comprises a drum 32 secured to the end of the drive shaft 14, while the cooperating stationary parts of the brake including brake band 33 are fixedly mounted relatively to the housing through member 34. In the specific modification illustrated, the brake 31 is of a conventional automotive hydraulic type, though any other suitable form of brake is represented thereby.

Coaxially mounted in the upper portion of the setworks housing is an indicator dial 35 and a control or setting dial 36. As illustrated more clearly in the sectional view of Figure 3, the indicator dial 35 is in the form of a cylindrical section or drum, to the inner surface of which is secured an annular ring 37 having elongated arcuate slots 38 therethrough. Dial 35 is adjustably secured to disc 39 by wing nuts 41 extending through slots 38 and threaded into disc 39. The disc 39 is secured to sleeve shaft 42 which is in turn rotatably journaled within bearing blocks 43 and 44 affixed to the opposite side walls 9 and 11 of the housing. Fixedly attached to the sleeve shaft 42 is a sprocket wheel 45 which is operatively connected by a chain 46 to the shaft section 12 in the lower portion of the housing, a cooperating sprocket 47 being provided upon shaft section 12. The chain 46 is trained over an adjustable idler sprocket 48 through which the tension of the chain may be regulated as will be described more fully hereinafter. The indicator dial 35 being coupled to the shaft section 12 is at all times rotatable with the shaft section to indicate the relative angular position thereof. In the specific application for the setworks herein described, namely, to a sawmill carriage, the indicator dial is provided with scales calibrated in terms of distance between the knees 3 and the saw. In the modification illustrated, three scales are provided on the dial 35, the turn ratio between the sprockets 45 and 47 being such that the dial 35 will make three complete revolutions as the knees 3 are moved from one limit of travel to the other. Assuming that the knees have a six foot travel, then the dial 35 will make one revolution for every two feet of travel of the knees and each scale may be correspondingly graduated. By making the diameter of the dial 35 relatively large, the scale divisions may be spread considerably so as to facilitate accurate reading and precise control of adjustment.

The control dial 36 is also of a cylindrical configuration having substantially the same diameter as the indicator dial 35. The dial 36 is connected by a disc 51 to a hub 52 which is arranged for longitudinal sliding movement upon the end 53 of the shaft 54. The shaft 54 extends concentrically through the sleeve shaft 42 and is suitably journaled therein at the opposite ends. The left end of the shaft 54, as viewed in Figure 3, is provided with a threaded portion 55 upon which are arranged a pair of lock nuts 56 providing a shoulder for engaging with the adjacent end of the sleeve shaft 42. Adjustably secured to the outermost end of shaft 54 is a hub 57 of a stop lever 58, the hub 57 being held in place by means of a nut 59.

The control dial 36 is normally rotatably movable relative to the dial 35 by means of a manual control lever 61. The inner end of the lever 61 extends through aligned cooperating openings in portions 62 of the bifurcated outer end of the shaft portion 53. Arranged within the slot of the bifurcated shaft end 53 is a bearing plate 63 having a length greater than the diameter of the shaft end so that the end portions thereof extend into shallow slots 64 provided in the adjacent end of the control dial hub 52. The end of the control lever 61 between the bifurcated ends of the shaft portion 53 is provided with a cam eccentric 65 securely attached thereto and which is cooperatively arranged within an opening provided in the plate 63. The lever 61 is cranked as indicated at 67 so that it may be rotated readily about the axis of the lever portion extending through the end of the shaft portion 53 to cause movement of the plate 63 axially of the shaft. A friction disc 68 is fixedly secured to one or the other of the dial discs 39 or 51 so that upon relative movement of the dial discs toward each other the friction disc 61 will be compressed therebetween so as effectively to lock the two dials together. As shown in full lines in the drawings, the control lever 61 has been rotated about its axis so that the eccentric 65 thereon has moved the plate 63 into engagement with the hub 52 of the control or set dial 36 moving the hub to the left relative to the shaft 54 and toward the indicator dial 35. Stated in another way, consider that the control dial 36 remains stationary and that by movement of the control lever 61 from the dotted line position to the full line position, the eccentric 65 acting through the bearing plate 63 tends to move the shaft 54 toward the right. The nut 56 on the opposite end of the shaft 54 engaging with the corresponding end of the shaft sleeve 42 tends to force the indicator dial disc 35 toward the right to compress the friction disc 68 between it and the control dial disc 51.

When dial 36 is clutched with dial 35 for movement therewith, it will obviously be moved at the same rate as dial 35. Accordingly, dial 36 is graduated with a scale substantially similar to the scale next adjacent thereto on the dial 35.

The dials 35 and 36 are enclosed within an extension 71 of the housing, a suitable bushing 72 being provided about the hub 52 of the set dial 36 to prevent entrance of dust into the housing. A window 73 is suitably arranged in the upper wall of the housing extension having a datum line 74 on the under surface thereof against which the dial scales may be read. The semicircular top of the housing is hinged as at 75 and provided with locking hasps 76 at the opposite side. Thus access may be had into the housing for effecting adjustment of wing nuts 41.

The stop lever 58 arranged on the end of the control dial shaft 54 is provided with a pivotal extension 77. The extension 77, pivotally mounted between the arms of the bifurcated end of the stop lever 58, is provided with shoulders 78 overlying the upper surfaces of the bifurcated lever arms to prevent pivotal movement of the extension 77 about its supporting pin in the counterclockwise direction as viewed in Figure 4. The shoulders 78 are normally held in engagement with the upper surfaces of the arms of lever 58 by means of a suitable spring 79. The outer end of the extension 77, upon movement thereof in the clockwise direction as viewed in Figure 4, is adapted to engage with an end of an arm 81 pivoted as at 82 to the adjacent side wall of the housing. The lower surface of the end of the lever 81, when rotated about its pivot 82 in the counterclockwise direction, is adapted to engage with a plunger 83 of a hydraulic cylinder 84 also suitably mounted as by bracket 85 on the housing wall 9. The plunger length is adjustable by means of a threaded coupling 86. The hydraulic cylinder 84 is connected by tubing 87 to the operating motor 88 of the brake 31. The outermost end of the lever 81 on the opposite side of the pivot 82 with respect to the stop extension 77 and the hydraulic cylinder plunger 83 is adapted to engage with a push button switch 89, the connections 91 of which extend to the controller for the driving motor 18.

The relation of the switch 89 and the hydraulic cylinder 84 with respect to the pivoted lever 81 is such that the switch will be actuated so as to effect the deenergization of the driving motor 18 slightly in advance of the tightening of the brake 31. For facilitating such advance action of the switch 89, the length of the lever arm extending adjacent thereto is somewhat greater than the length of the arm between the pivot point 82 and the end of the hydraulic cylinder plunger 83. With such a relation of lever arms a relatively slight angular movement of the lever by stop extension 77 will effect a sufficient movement of the switch 89 to accomplish the desired purpose before the hydraulic cylinder plunger will be moved sufficiently to effect setting of the brake. By virtue of the coupling 86 in the plunger 83, the length of the plunger may be adjusted to suit the operational characteristics of the apparatus.

Numerous adjustments which have been only briefly referred to hereinbefore will be described now in greater detail. Upon installation of the setworks and before the chain 46 is trained over the sprockets 45 and 47, the distance between the faces of the carriage knees 3 and the saw is accurately measured and the indicator dial 35 rotated until the proper scale reads approximately the correct distance. By virtue of the space between the sprocket teeth, an accurate adjustment cannot be made as the chain is mounted over the cooperating sprockets. The wing nuts 41 are then loosened and the indicator dial 35 is then shifted relative to the supporting disc 39 until the exact distance is indicated by the proper dial scale relative to the datum line 74. The wing nuts 41 are then tightened, fixedly securing the indicator dial 35 onto the supporting disc 39, whereupon it will always read accurately in response to subsequent movements of the carriage knees 3.

After the chain 46 has been trained over its cooperating sprockets, and before final adjustment is made of dial 35, the tension of the chain is adjusted by means of the idler sprocket 48. The idler sprocket 48, it will be observed, is mounted by a pin 101 between a pair of spaced supporting plates 102 which plates are in turn pivotally mounted upon a shaft 103 suitably supported at its opposite ends in bearings 104 secured to the opposite side walls of the housing. The position of the sprocket 48 relative to the chain 46 may be adjusted by means of a screw 105 (Fig. 4) threaded through nut 106 supported on pin 107 between the upper ends of the plates 102. The screw 105 is rotatably mounted in a cooperating aperture in the housing side wall, suitable collars 108 being provided on the screw for preventing relative axial movement of the screw with respect to the housing. Adjustment of the screw may be effected by means of a suitable wrench applied to the squared end 109 of the screw.

The control stop lever 58 is adjustably mounted on the end of the control dial shaft 54 by means of the nut 59 so that its engagement with the lever 81 can be made to correspond with the scale of the control dial. By proper adjustment of the brake mechanism, including the hydraulic cylinder 84 and the stop lever 58, the setting of the brake can be made to occur at the instant the zero of the control dial scale coincides with the datum line 74.

The motor control system will now be described with particular reference to Figure 6. The motor 18 is of a reversible type adapted to be energized from a suitable source of supply indicated by supply conductors 110, 111, 112 through a controller indicated generally at 113. The controller 113 includes a forward contactor 114 and a reverse contactor 115, and a manually operable switch 116 for selectively controlling the energization of the electric magnetic operators 117 and 118 of the forward and reverse contactors 114 and 115, respectively. The limit switch 22 driven from the setworks shaft 17 is provided with two sets of normally closed contacts 121 and 122 arranged in the control circuits of the forward and reverse contactors, respectively. The switch 22 is so adjusted that contacts 121 open at the forward limit of travel of the knees 3 upon the carriage head blocks 1 and contacts 122 open upon the knees reaching their limit of travel in the reverse direction. The normally closed contacts 123 of switch 89 are arranged in the control circuit of the forward contactor 114.

The operation of the setworks may be described as follows: The indicator dial 35 being operatively connected through chain 46 to the operating shaft 7 of the carriage, and hence to the knees 3, will indicate the distance between the knees and the saw, or, in other words, the total thickness of the log supported on the head blocks 1. Assume, for example, that this distance is just 24 inches, then the numeral 24, read on the second scale of the indicator dial 35, will appear under the datum line 74 on the housing window 73. Assume now that it is desired to shift the log forward on the carriage in readiness for the next sawing operation. If the next board is to be cut, two inches, for example, in thickness, then the control dial 36 will be rotated relative to the indicator dial until the numeral 2 appears underneath the datum line 74. This latter operation is accomplished by first declutching the control dial 36 by swinging the manual control lever 61 outwardly to the dotted line position and then rotating it by the required amount. The manual control lever 61 is then swung inwardly toward the housing to lock the two dials together. Movement of the control dial 36 to the new set position will rotate the control stop lever 58 and its extension 77 in the counterclockwise direction by a corresponding angle. The motor 18 is then energized by shifting the lever of controller 116 to the forward position, whereupon the operating shaft will be driven in such a direction as to cause the knees 3 to move forwardly on the blocks 1. The two dials 35 and 36 will be rotated in response to the advancement of the carriage knees until the numeral 22 of the indicator dial and zero of the control dial 36 will register in coincidence with the datum line 74. Slightly in advance of these indications by dials 35 and 36, the control stop extension 77 will have engaged with the end of the pivoted lever 81, the opposite end of which will have engaged with the stop switch 89 and effected a deenergization of the motor 18. Due to the inertia of the rotating parts, the mechanism will continue in movement for a certain short period of time, causing continued advancement of the carriage knees 3. The hydraulic cylinder 84 and the mechanism of the brake 31 is so adjusted that at the instant that the control dial 36 reads zero, the brake 31 will be set to immediately arrest the rotation of the driving connection between the motor 18 and the operating shaft. Due to the fact that the driving motor 18 is operated at a high speed relative to the speed of rotation of the operating shaft 7, and the inertia energy tending to cause the advancement of the carriage knees 3 following the deenergization of the motor 18 will be greatest at the motor end of the driving connection, it is preferred to mount the brake 31 on the end of the drive shaft 14 as illustrated. For other considerations, however, one might prefer to arrange the brake either on the operating shaft 7 or on an extension of the intermediate gearing shaft 17.

It will be observed that the control dial 36 is returned at the completion of each adjustment to zero, while the indicator dial 35 is simultaneously readjusted so as to indicate the exact distance remaining between the carriage knees and the saw. Since the control dial 36 is returned to zero each time, it is a relatively simple matter to reset the control dial for any desired thickness of cut by a direct reading of the scale thereof. No calculations are required in the manner of additions or subtractions of thicknesses, which frequently run into fractions, from a larger amount indicative of the total remainder. Such calculations frequently are required in the manipulation of conventional setworks. Moreover, the setting of the control dial 36 may be made during the interim that one board is being sawed from the log. It will readily be understood that due to the weight of the log on the carriage, and the frictional resistance of the knees on the head blocks, the brake is not required to hold the log in the adjusted position throughout the sawing operation. Thus, as soon as the carriage has been adjusted to a new position and the operating mechanism of the setworks brought to standstill, the sawing operation may be commenced immediately and the setworks control dial 36 reset for the next succeeding cut. Immediately upon the return of the carriage to the position ahead of the saw, the motor control switch 116 may be moved to the forward driving position, whereupon the log will immediately be shifted forward on the carriage to the new position as determined by the previous setting of the control dial and upon completion of such adjustment the motor will automatically be deenergized by switch 89 and the setworks brought to standstill.

Now assume that the cutting of one log has been completed and that it is desired to withdraw the knees 3 to the opposite limit of travel in order to condition the carriage for the reception of a new log. The control dial is first declutched from the indicator dial and the driving motor 18 is reversed by shifting of the control switch 116 therefor to the reverse position. The knees 3 will thereupon be shifted backwardly upon the head blocks 1, moving the indicator dial 35 therewith, but the control dial 36 as well as the brake 31 will remain inoperative. Jamming of the nut 4 upon the read end of the screw 5 is precluded by opening of limit switch contacts 122. After a new log has been loaded onto the carriage, the knees 3 are then shifted forwardly into engagement with the log and the log shifted forward relatively closely adjacent the front end of the carriage by operation of the motor in the forward direction. Successive cuts may then be taken from the log in the manner described by manipulation of the setworks.

Assume that the setter failed first to declutch the control dial 36 from the indicator dial 35 before shifting the motor control switch to the reversed position for withdrawing the carriage knees 3. In such an eventuality the control dial 36 would be driven in the reverse direction along with the indicator dial 35. Such reverse movement would, in all probability, continue throughout a plurality of complete revolutions. In order to prevent injury to the stop mechanism, the extension 77 is pivotally mounted on the stop lever 58 as previously described, and the upper corner thereof is rounded so that upon rotation of the stop lever in the counterclockwise direction throughout a plurality of revolutions the extension 77, upon striking against the lower surface of the end of the control lever 81, the extension 77 will pivot about its support and pass freely over the end of lever 81.

As previously indicated, it will be obvious to those skilled in the art that any suitable form of brake may be substituted for the hydraulic brake 31 with appropriate alterations in the apparatus described for controlling the particular type of brake selected. In Figure 7 is illustrated schematically an arrangement including an electromagnetic brake. The electromagnetic brake, indicated generally at 130, may be of any suitable form well known to those skilled in the art, and having a brake band 131 for cooperatively engaging the surface of a drum mounted on the end of the drive shaft 14 previously described. The winding of the electromagnetic operator for the brake may be connected by leads 132 to the controller 133 for the motor 18, the controller in this instance being provided with suitable contacts for effecting the energization of the winding with the energization of the driving motor 18 for operation in either direction. Deenergization of the winding and setting of the brake may be effected through the stop switch 89 provided as before for deenergizing the motor 18. In order that the motor 18 will be deenergized slightly in advance of the application of the electromagnetic brake, it may be desirable to provide a suitable time delay relay in the control of the circuit 132. If desired, the circuit 132 may be controlled by a separate switch arranged in a manner similar to the hydraulic cylinder 84 of the previously described modification and correspondingly operated.

The setworks as described may be built as a compact unit for installation in any of the conventional types of sawmill carriages. The knees 3 of the carriage shown are driven throw a screw and traveling nut arrangement, but it will be obvious that the setworks is equally applicable for effecting adjustment of knees which are driven through a rack and pinion connection. The invention is furthermore not to be limited to an arrangement including an electric motor drive, since motive power may be supplied from line shafting through a belt connection with the power controlled through a clutch arrangement. Furthermore, the setworks may be attached to any operating shaft which it is desired to control. In the particular application shown, a short section of the operating shaft 7 has been cut out and the shaft section 12 of the setworks coupled to the adjacent ends of the operating shaft thus formed. The setworks could have been so mounted that the shaft section 12 would need to have been coupled to only one or the other of the opposite ends of the operating shaft 7.

Having described the principles of the invention in what is considered to be preferred embodiments thereof, it is desired that it be understood that in the appended claims it is intended to cover all such variations and modifications as fall within the true spirit and scope of the invention.

I claim:

1. A setworks for a sawmill carriage having a plurality of head blocks, knees movably mounted on said blocks and an operating shaft for actuating said knees, said setworks comprising a casing, a shaft section extending through the lower portion of said casing and journaled therein, said shaft section being adapted for coupling to said operating shaft, a drive shaft journaled in said casing and geared to said shaft section, a driving motor coupled to said drive shaft, a brake drum on said drive shaft, a brake band mounted on said casing for cooperatively engaging said drum, an actuator for said brake band, an indicator dial rotatably mounted in the upper portion of said casing, a driving connection between said indicator dial and said shaft section, an adjustable control dial rotatably mounted coaxially with said indicator dial, said dials having adjacent disc surfaces, a shaft rotatable with said control dial, a stop on said control dial shaft, means for shifting said dials relatively toward each other into frictional engagement of said disc surfaces for securing said control dial to said indicator dial for movement therewith, and means adapted to be engaged by said stop for energizing said brake band actuator.

2. A setworks for a sawmill carriage having a plurality of head blocks, knees slidably mounted on said blocks and an operating shaft for said knees, said setworks comprising a casing, a shaft section journaled in said casing and adapted to be coupled to said operating shaft, a drive shaft journaled in said casing and geared to said shaft section, a brake on said drive shaft normally biased to released position, an indicator dial rotatably mounted in said casing, a driving connection between said indicator dial and said shaft section, an adjustable control dial including a shaft rotatable therewith mounted coaxially with said indicator dial, means for securing said control dial relative to said indicator dial for movement therewith, a stop on said control dial shaft, and means adapted to be engaged by said stop for setting said brake, said brake being automatically released upon disengagement of said stop from said last mentioned means.

3. A setworks for a sawmill carriage having a plurality of head blocks, knees slidably mounted on said blocks and an operating shaft for said knees, said setworks comprising a casing, a drive shaft journaled in said casing and adapted to be operatively coupled to said operating shaft, a brake operatively associated with said drive shaft, an indicator dial rotatably mounted in said casing, a driving connection between said indicator dial and said drive shaft, an adjustable control dial including a shaft rotatable therewith mounted coaxially with said indicator dial, said control dial being axially movable, means for axially shifting said control dial into frictional engagement with said indicator dial for securing said control dial relative to said indicator dial, a stop on said control dial shaft, and means adapted for actuation by said stop for axially shifting said control dial into frictional engagement with said indicator dial for effecting setting of said brake to preclude further rotation of said drive shaft.

4. A setworks for a sawmill carriage having a plurality of head blocks, knees slidably mounted on said head blocks and an operating shaft for said knees, said setworks comprising a support, motor means, a driving connection between said motor means and said shaft, an indicator means rotatably mounted on said support, means for controlling the driving of said shaft in either direction by said motor, a connection between said indicator means and said shaft for rotating said indicator means in accordance with rotation of said shaft, an adjustable stop rotatably mounted on said support and adapted to be fixedly secured relative to said indicator means for rotation therewith, a brake operatively associated with said operating shaft, and means adapted to be actuated by said stop upon selective predetermined movement of said indicator means in one direction for effecting setting of said brake said brake being automatically released following the setting thereof upon rotation of said stop in the reverse direction.

5. A setworks for selectively predetermining the angular movement of an operating shaft, said setworks comprising a support, a drive shaft journaled on said support and adapted to be operatively connected to said operating shaft, a normally released brake mounted on said support and operatively associated with said drive shaft, indicator means mounted on said support and operatively connected to said operating shaft for indicating the relative angular position of said operating shaft, control means mounted on said support and adapted to be connected to said indicator means, and means arranged for actuation by said control means upon selective predetermined movement of said indicator means in one direction for effecting setting of said brake, said brake being automatically released upon disconnection of said control means from said indicator means and movement thereof in the reverse direction.

6. A setworks for selectively predetermining the angular movement of an operating shaft, motor means, means for energizing said motor means, a driving connection between said motor means and said operating shaft, a brake normally biased to the released position operatively associated with said operating shaft, indicator means operatively connected to said operating shaft for indicating the relative angular position thereof, control means adapted to be adjustably secured relative to said indicator means and arranged for effecting first a deenergization of said motor means and subsequently the setting of said brake upon selective predetermined movement of said indicator means said brake being automatically released upon release of said control means from said indicator means.

7. A setworks for selectively predetermining the angular movement of an operating shaft, said setworks comprising a housing, a shaft section journaled in said housing and adapted to be operatively coupled to said operating shaft, a drive shaft journaled in said housing, gearing between said drive shaft and said shaft section, a brake mounted on said housing and operatively associated with said drive shaft, an indicator dial rotatably mounted on said housing, a driving connection between said indicator dial and said shaft section whereby said dial indicates the relative angular position of said operating shaft, a control dial including a shaft rotatable therewith mounted coaxially with said indicator dial, said control dial being axially shiftable, a manual control lever connected to said control dial for effecting relative rotation between said control dial and said indicator dial, means actuated by said control lever for shifting said control dial into frictional engagement with said indicator dial and locking said control dial relative to said indicator dial for movement with the latter, a brake control lever associated with said control dial shaft whereby setting of said brake is effected upon a predetermined movement of said operating shaft with said dials locked together.

8. A setworks for a sawmill carriage having a plurality of head blocks, knees movably mounted on said blocks and an operating shaft connected to said knees for adjusting said knees relative to said blocks, said setworks comprising a reversible motor, a driving connection between said motor and said shaft, control means for energizing and de-energizing said motor, a normally released brake associated with said shaft, means for tightening said brake, an indicator means driven by said motor for indicating the relative position of said knees on said blocks, a motor stop switch, means adapted to be selectively secured relative to said indicator means for engaging said stop switch and said brake tightening means in responsive to predetermined selective adjustment of said knees, and limit switch means operable by said motor for effecting de-energization of said motor in response to movement of said knees to limit of travel in either direction.

9. A sawmill carriage setworks comprising an enclosing housing, a set shaft journaled in the lower ends of a pair of opposite side walls of said housing, a drive shaft journaled in said housing side walls, speed reducing gearing journaled in said side walls connecting said shafts, a brake mounted on the outer surface of one of side walls and arranged about one end of said drive shaft projecting through said one side wall, an indicator shaft journaled in the upper end of said housing and operatively connected to said set shaft for rotation thereby, a disc fixedly secured on an end of said indicator shaft, a cylindrical indicator dial adjustably secured to said disc, a cylindrical control dial including a supporting disc, a shaft supporting said control dial, said last mentioned shaft extending coaxially through said indicator shaft, lever means for shifting said control dial into locking engagement with said indicator dial and for securing said coaxial shafts relative to each other for rotation in unison, and brake control means secured to the inner one of said coaxial shafts.

10. A setworks for selectively predetermining the angular movement of an operating shaft, said setworks comprising a brake operatively associated with said shaft, an indicator dial operatively connected to said shaft for indicating the relative angular position thereof, a support for said dial, an adjustable control dial mounted coaxially with said indicator dial, means defining a pair of annular cooperating smooth friction surfaces secured relatively to corresponding ones of said dials, manual control means for clamping said surfaces together in any relative angular position of adjustment of said dials throughout 360 degrees, and means on said support connected for operation by said control dial for effecting setting of said brake upon predetermined movement of said control dial by said indicator dial.

11. A setworks for selectively predetermining the angular movement of an operating shaft, said setworks comprising a drive shaft adapted to be operatively connected to said operating shaft, a brake operatively associated with said drive shaft, driving means for said drive shaft, indicator means for indicating the relative angular position of said operating shaft, a control stop lever, means for adjustably securing said control stop lever relative to said indicator means, lever means adapted to be engaged by said control stop lever on selective predetermined movement of said indicator means for effecting setting of said brake, said brake being automatically released upon disengagement of said control stop lever from said lever means.

LESTER J. PETERS.